United States Patent
Trimponias et al.

(10) Patent No.: US 11,184,284 B2
(45) Date of Patent: Nov. 23, 2021

(54) DATA PACKET FORWARDING METHOD AND APPARATUS

(71) Applicant: Huawei Technologies Co., Ltd., Shenzhen (CN)

(72) Inventors: Georgios Trimponias, Hong Kong (CN); Zhitang Chen, Hong Kong (CN); Hong Xu, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/285,796

(22) Filed: Feb. 26, 2019

(65) Prior Publication Data
US 2019/0190833 A1 Jun. 20, 2019

Related U.S. Application Data

(63) Continuation of application No. PCT/CN2017/071929, filed on Jan. 20, 2017.

(30) Foreign Application Priority Data

Aug. 26, 2016 (CN) .......................... 201610729694.1

(51) Int. Cl.
*H04L 12/803* (2013.01)
*H04L 12/851* (2013.01)
(Continued)

(52) U.S. Cl.
CPC .......... *H04L 47/125* (2013.01); *H04L 43/026* (2013.01); *H04L 45/123* (2013.01);
(Continued)

(58) Field of Classification Search
CPC ... H04L 47/125; H04L 43/026; H04L 45/123; H04L 45/38; H04L 49/25; H04L 61/2007
See application file for complete search history.

(56) References Cited

U.S. PATENT DOCUMENTS

2001/0048662 A1* 12/2001 Suzuki .................... H04L 47/32
370/230
2005/0108444 A1* 5/2005 Flauaus ................... H04L 47/11
710/15
(Continued)

FOREIGN PATENT DOCUMENTS

CA 2847913 A1 9/2015
CN 101674253 A 3/2010
(Continued)

OTHER PUBLICATIONS

Fine-grained load balancing with traffic-aware rerouting in datacenter networks; Zhang et al. Journal of Cloud Computing: Advances, Systems and Applications (Year: 2021).*
(Continued)

*Primary Examiner* — Deepa Belur
(74) *Attorney, Agent, or Firm* — Conley Rose, P.C.

(57) ABSTRACT

A data packet forwarding method and apparatus, where the method includes collecting, by a source switch according to a preset sampling period, congestion extents of d sampling paths in n paths, storing congestion extent indication information of each sampling path, where d is less than n, selecting, according to the congestion extent indication information, a first target sampling path with a smallest congestion extent at a first time point, forwarding a first data packet using the first target sampling path, storing an identifier of a first data flowcell to which the first data packet belongs forwarding a second data packet using the first target sampling path when an identifier of a second data flowcell to which the second data packet belongs is the same as the identifier of the first data flowcell.

20 Claims, 5 Drawing Sheets

(51) Int. Cl.
*H04L 12/801* (2013.01)
*H04L 12/26* (2006.01)
*H04L 12/707* (2013.01)
*H04L 12/721* (2013.01)
*H04L 12/947* (2013.01)
*H04L 29/12* (2006.01)

(52) U.S. Cl.
CPC .............. *H04L 45/24* (2013.01); *H04L 45/38* (2013.01); *H04L 47/11* (2013.01); *H04L 47/122* (2013.01); *H04L 47/2483* (2013.01); *H04L 49/25* (2013.01); *H04L 61/2007* (2013.01)

(56) References Cited

U.S. PATENT DOCUMENTS

| | | | |
|---|---|---|---|
| 2005/0160171 A1* | 7/2005 | Rabie | H04L 47/822 709/227 |
| 2007/0041326 A1* | 2/2007 | Babiarz | H04L 45/22 370/237 |
| 2008/0049641 A1* | 2/2008 | Edwards | H04L 43/0852 370/253 |
| 2008/0049753 A1* | 2/2008 | Heinze | H04L 47/726 370/392 |
| 2010/0150161 A1* | 6/2010 | Saksena | H04L 45/124 370/400 |
| 2011/0149733 A1* | 6/2011 | Chen | H04L 12/5691 370/235 |
| 2011/0158105 A1 | 6/2011 | Duffield et al. | |
| 2012/0230186 A1* | 9/2012 | Lee | H04L 43/18 370/230 |
| 2014/0269288 A1 | 9/2014 | Crisan et al. | |
| 2015/0124623 A1 | 5/2015 | Li et al. | |
| 2015/0127797 A1 | 5/2015 | Attar et al. | |
| 2015/0200857 A1 | 7/2015 | Tang et al. | |
| 2015/0365328 A1* | 12/2015 | Luke | H04L 45/74 370/238 |
| 2017/0295101 A1* | 10/2017 | Hira | H04L 43/0876 |
| 2017/0324664 A1* | 11/2017 | Xu | H04L 12/4633 |

FOREIGN PATENT DOCUMENTS

| | | | | |
|---|---|---|---|---|
| CN | 102868631 | A | 1/2013 | |
| CN | 104023006 | A | 9/2014 | |
| CN | 104168212 | A | 11/2014 | |
| CN | 104283804 | A | 1/2015 | |
| CN | 104579961 | A | 4/2015 | |
| CN | 105594169 | A | 5/2016 | |
| CN | 105610820 | A | 5/2016 | |
| CN | 105636212 | A | 6/2016 | |
| WO | 2009075619 | A1 | 6/2009 | |
| WO | WO-2010004409 | A1 * | 1/2010 | ......... H04L 47/2433 |
| WO | WO-2016083740 | A1 * | 6/2016 | ........... H04L 65/608 |

OTHER PUBLICATIONS

Machine Translation and Abstract of Chinese Publication No. CN104023006, Sep. 3, 2014, 34 pages.

Machine Translation and Abstract of Chinese Publication No. CN105636212, Jun. 1, 2016, 9 pages.

Foreign Communication From A Counterpart Application, Chinese Application No. 201610729694.1, Chinese Office Action dated Feb. 3, 2020, 7 pages.

He, K., et al., "Presto: Edge-based Load Balancing for Fast Datacenter Networks," SIGCOMM'15, Aug. 17-21, 2015, pp. 465-478.

Alizadeh, M., et al., "CONGA: Distributed Congestion-Aware Load Balancing for Datacenters," SIGCOMM'14, Aug. 17-22, 2014, 12 pages.

Machine Translation and Abstract of Chinese Publication No. CN104168212, Nov. 26, 2014, 24 pages.

Machine Translation and Abstract of Chinese Publication No. CN104283804, Jan. 14, 2015, 11 pages.

Foreign Communication From A Counterpart Application, PCT Application No. PCT/CN2017/071929, English Translation of International Search Report dated Jun. 15, 2017, 2 pages.

Foreign Communication From A Counterpart Application, PCT Application No. PCT/CN2017/071929, English Translation of Written Opinion dated Jun. 15, 2017, 4 pages.

Foreign Communication From A Counterpart Application, European Application No. 17842526.0, Extended European Search Report dated Jun. 25, 2019, 13 pages.

* cited by examiner

DATA PACKET FORWARDING METHOD AND APPARATUS

CROSS-REFERENCE TO RELATED APPLICATIONS

This application is a continuation of International Patent Application No. PCT/CN2017/071929 filed on Jan. 20, 2017, which claims priority to Chinese Patent Application No. 201610729694.1 filed on Aug. 26, 2016. The disclosures of the aforementioned applications are hereby incorporated by reference in their entireties.

TECHNICAL FIELD

The present application relates to the data processing field, and in particular, to a data packet forwarding method and apparatus.

BACKGROUND

A tree-like network topology structure is selected in most current data center networks, and the network topology structure may provide multiple equal-cost paths for a network terminal. To implement load balancing, when forwarding a data packet, a switch in the network topology structure generally selects an equal-cost multi-path (ECMP) routing protocol to randomly forward the data packet to an equal-cost output port. Although the ECMP routing protocol is easily implemented, the ECMP routing protocol has an obvious disadvantage, that is, a routing conflict. The routing conflict means that data packets of multiple data streams are forwarded to a same path, and consequently network congestion occurs. This seriously affects a network throughput, and easily leads to problems such as a delay of forwarding a data stream of small traffic.

In other approaches, a concept of a flowcell and a concept of a flowlet are used, a data stream is split into multiple flowcells or flowlets, and a path is selected to forward each flowcell or flowlet. In the other approaches, a round robin load balancing method is used to query congestion extent of all valid paths in a network and successively allocate flowcells or flowlets to the valid paths for forwarding. Although a load balancing effect can be achieved in some scenarios, multiple flowcells or flowlets still cannot be prevented from being forwarded to a same valid path, and this causes network congestion. Therefore, applicability is low, and scalability is poor.

SUMMARY

This application provides a data packet forwarding method and apparatus in order to improve applicability of data packet forwarding and improve scalability of network congestion awareness.

According to a first aspect, a data packet forwarding method is provided, and the method may include collecting, by a source switch according to a preset sampling period, congestion extents of d sampling paths in n paths that are from the source switch to a destination switch, and storing congestion extent indication information that is of each sampling path and that is obtained by means of collection, where d is less than n, when the source switch forwards a first data packet of a data stream, selecting, from the d sampling paths according to the congestion extent indication information, a first target sampling path with a smallest congestion extent at a first time point, forwarding the first data packet using the first target sampling path, and storing an identifier of a first data flowcell to which the first data packet belongs, when the source switch forwards a second data packet of the data stream, determining whether an identifier of a second data flowcell to which the second data packet belongs is the same as the identifier of the first data flowcell, and forwarding the second data packet using the first target sampling path when the identifier of the second data flowcell is the same as the identifier of the first data flowcell, or when the identifier of the second data flowcell is different from the identifier of the first data flowcell, selecting, from the d sampling paths according to the congestion extent indication information, a second target sampling path with a smallest congestion extent at a second time point, and forwarding the second data packet using the second target sampling path.

In this application, before forwarding the data stream to the destination switch, the source switch may preselect sampling paths in all paths that are from the source switch to the destination switch, collect the congestion programs of the sampling paths according to the preset sampling period, and store the congestion program indication information of each sampling path in local storage of the source switch such that scalability of network congestion awareness is improved. When forwarding the data stream, the source switch forwards data in data flowcells, each data flowcell includes one or more data packets, and all data packets that belong to a same data flowcell are forwarded on a same sampling path. When forwarding the first data packet of each data flowcell, the source switch may search, according to a current time point at which the data packet is forwarded, the local storage for a target sampling path with a smallest network congestion program at a current time point, and forward the data packet using the target sampling path. When a same sampling path is a path with a smallest congestion extent in multiple preset sampling periods, different data flowcells may be forwarded on the same sampling path, that is, when the first data packet of each data flowcell is forwarded, the path with a smallest congestion extent at a current time point is selected for forwarding. When paths with a smallest network congestion extent that are collected in different preset sampling periods are different, and forwarding duration of a data flowcell is greater than a length of a sampling period, different data flowcells are forwarded on different sampling paths such that applicability of data packet forwarding is improved, and network load balancing is better implemented.

With reference to the first aspect, in a first possible implementation, collecting, by a source switch according to a preset sampling period, congestion extents of d sampling paths in n paths that are from the source switch to a destination switch includes randomly selecting, by the source switch according to the preset sampling period, the d sampling paths from the n paths that are from the source switch to the destination switch, and sending d sampling probes that are in a one-to-one correspondence with the d sampling paths to the destination switch, and receiving a feedback probe that is of each sampling probe in the d sampling probes and that is fed back by the destination switch, and obtaining the congestion extent indication information that is of each sampling path and that is carried in the feedback probe of each sampling probe.

In this application, a local path sampling manner may be used to get aware of a network congestion extent such that complexity of network congestion awareness may be reduced, and extra overheads are reduced. The congestion extent of the sampling path is probed using the sampling probe such that accuracy of network congestion extent awareness may be improved, and controllability of network load balancing is improved.

With reference to the first possible implementation of the first aspect, in a second possible implementation, randomly selecting, by the source switch according to the preset sampling period, the d sampling paths from the n paths that are from the source switch to the destination switch includes, when n is less than a first preset threshold, randomly selecting, by the source switch, d1 sampling paths from the n paths according to the preset sampling period, or when n is greater than or equal to a first preset threshold, randomly selecting, by the source switch, d2 sampling paths from the n paths according to the preset sampling period, where d1 is less than d2, and d2 is less than n.

In this application, when the paths between the source switch and the destination switch are sampled, a quantity of sampling paths may be determined according to a magnitude of a network scale such that flexibility of a path sampling operation is improved, accuracy of network congestion awareness is improved, and applicability of network load balancing is enhanced.

With reference to the second possible implementation of the first aspect, in a third possible implementation, the sampling probe or the feedback probe of the sampling probe is a data packet in a specified format, the data packet in the specified format includes a probe header, and a first quantity of bits included in the probe header are used to identify a sampling path number, and a second quantity of bits included in the probe header are used to identify congestion extent indication information of a sampling path.

In this application, a data packet format of the sampling probe and a data packet format of the feedback probe that is corresponding to the sampling probe may be self-defined, and the sampling path and the congestion extent that is corresponding to the sampling path may be determined using the sampling probe and the feedback probe that is corresponding to the sampling probe such that design is flexible, accuracy and pleasure of network congestion awareness are enhanced, and user experience on a terminal is improved.

With reference to the third possible implementation of the first aspect, in a fourth possible implementation, the congestion extent indication information of the d sampling paths includes a congestion extent level of each sampling path in the d sampling paths, the congestion extent level of each sampling path is determined by a sum of queue lengths of intermediate switches on the sampling path, and the intermediate switch is a switch other than the source switch and the destination switch on the sampling path.

In this application, a queue length of a switch is used as congestion extent indication information of a network path, and this applies to a feature that a data flowcell in a data stream is more sensitive to a queue length of a switch such that accuracy of congestion extent awareness of a sampling path is improved, thereby improving accuracy for controlling network load balancing of data forwarding.

With reference to any one of the first aspect to the fourth possible implementation of the first aspect, in a fifth possible implementation, before forwarding, by the source switch, a first data packet of a data stream, the method further includes splitting, by the source switch, the data stream into at least one data flowcell of a preset data size according to a time sequence, where each data flowcell in the at least one data flowcell includes at least one data packet, and adding an identifier of each data flowcell in the at least one data flowcell, and adding, to each data packet included in each data flowcell, the identifier of the data flowcell to which the data packet belongs.

In this application, forwarding of a data stream is converted to forwarding of a data flowcell, and an ownership relationship between a data flowcell and a data packet included in the data flowcell may be established using an identifier of the data flowcell such that a routing path may be selected for the data flowcell by selecting a routing path for the data packet, and controllability of network load balancing of data routing is enhanced.

With reference to the fifth possible implementation of the first aspect, in a sixth possible implementation, the identifier of each data flowcell includes at least one of identification information of the data stream or a number of each data flowcell in the data stream, and the identification information of the data stream includes at least one of a source Internet Protocol (IP) address, a source port, a destination IP address, a destination port, or a protocol number.

In this application, data flowcells included in the data stream may be marked using identification information in multiple forms such that an operation is flexible, and applicability is high.

With reference to the sixth possible implementation of the first aspect, in a seventh possible implementation, after the storing an identifier of a first data flowcell to which the first data packet belongs, the method further includes storing a number of the first target sampling path, and establishing a correspondence between the identifier of the first data flowcell and the number of the first target sampling path, and forwarding the second data packet using the first target sampling path when the identifier of the second data flowcell is the same as the identifier of the first data flowcell includes, when the identifier of the second data flowcell is the same as the identifier of the first data flowcell, determining the first target sampling path according to the identifier of the second data flowcell and the correspondence, and forwarding the second data packet using the first target sampling path.

In this application, after a data packet is forwarded, a correspondence between an identifier of a data flowcell and a forwarding path of the data packet included in the data flowcell is stored in local storage space such that when a data routing request is sent for another data packet included in the same data flowcell, the local storage is searched for the target sampling path, to forward the data packet. Therefore, data packet forwarding efficiency is improved, and power consumption is reduced.

With reference to the first possible implementation of the first aspect, in an eighth possible implementation, the preset sampling period is greater than 20 microseconds (μs) and less than 60 μs.

In this application, any numerical value from 20 μs to 60 μs may be used as the preset sampling period, and a moderate preset sampling period is set such that network performance may be improved, and applicability of local path sampling may be enhanced.

With reference to the fifth possible implementation of the first aspect, in a ninth possible implementation, the preset data size is less than or equal to 64 kilobytes (KB).

In this application, 64 KB is used as an upper limit of a size of split data such that data forwarding may be better implemented, thereby improving data forwarding efficiency, and enhancing controllability of network load balancing.

According to a second aspect, a data packet forwarding apparatus is provided, and the apparatus may include a sampling module configured to collect, according to a preset sampling period, congestion extents of d sampling paths in n paths that are from a source switch to a destination switch, and store congestion extent indication information that is of each sampling path and that is obtained by means of collection, where d is less than n, a forwarding module configured to, when forwarding a first data packet of a data stream, select, from the d sampling paths according to the congestion extent indication information that is collected by the sampling module, a first target sampling path with a smallest congestion extent at a first time point, and forward the first data packet using the first target sampling path, a storage module configured to store an identifier of a first data flowcell to which the first data packet that is forwarded by the forwarding module belongs, and a determining module configured to, before the forwarding module forwards a second data packet of the data stream, determine whether an identifier of a second data flowcell to which the second data packet belongs is the same as the identifier of the first data flowcell that is stored in the storage module, where the forwarding module is further configured to, when a determining result of the determining module is that the identifier of the second data flowcell is the same as the identifier of the first data flowcell, forward the second data packet using the first target sampling path, and the forwarding module is further configured to when the determining result of the determining module is that the identifier of the second data flowcell is different from the identifier of the first data flowcell, select, from the d sampling paths according to the congestion extent indication information that is collected by the sampling module, a second target sampling path with a smallest congestion extent at a second time point, and forward the second data packet using the second target sampling path.

With reference to the second aspect, in a first possible implementation, the sampling module is further configured to randomly select, according to the preset sampling period, the d sampling paths from the n paths that are from the source switch to the destination switch, and send d sampling probes that are in a one-to-one correspondence with the d sampling paths to the destination switch, and receive a feedback probe that is of each sampling probe in the d sampling probes and that is fed back by the destination switch, and obtain the congestion extent indication information that is of each sampling path and that is carried in the feedback probe of each sampling probe.

With reference to the first possible implementation of the second aspect, in a second possible implementation, the sampling module is further configured to, when n is less than a first preset threshold, randomly select d1 sampling paths from the n paths according to the preset sampling period, or when n is greater than or equal to a first preset threshold, randomly select d2 sampling paths from the n paths according to the preset sampling period, where d1 is less than d2, and d2 is less than n.

With reference to the second possible implementation of the second aspect, in a third possible implementation, the sampling probe or the feedback probe of the sampling probe is a data packet in a specified format, the data packet in the specified format includes a probe header, and a first quantity of bits included in the probe header are used to identify a sampling path number, and a second quantity of bits included in the probe header are used to identify congestion extent indication information of a sampling path.

With reference to the third possible implementation of the second aspect, in a fourth possible implementation, the congestion extent indication information of the d sampling paths includes a congestion extent level of each sampling path in the d sampling paths, the congestion extent level of each sampling path is determined by a sum of queue lengths of intermediate switches on the sampling path, and the intermediate switch is a switch other than the source switch and the destination switch on the sampling path.

With reference to any one of the second aspect to the fourth possible implementation of the second aspect, in a fifth possible implementation, the apparatus further includes a data splitting module configured to, before the forwarding module forwards the first data packet of the data stream, split the data stream into at least one data flowcell of a preset data size according to a time sequence, where each data flowcell in the at least one data flowcell includes at least one data packet, and the data splitting module is further configured to add an identifier of each data flowcell in the at least one data flowcell, and add, to each data packet included in each data flowcell, the identifier of the data flowcell to which the data packet belongs.

With reference to the fifth possible implementation of the second aspect, in a sixth possible implementation, the identifier of each data flowcell includes at least one of identification information of the data stream or a number of each data flowcell in the data stream, and the identification information of the data stream includes at least one of a source IP address, a source port, a destination IP address, a destination port, or a protocol number.

With reference to the sixth possible implementation of the second aspect, in a seventh possible implementation, the storage module is further configured to store a number of the first target sampling path, and establish a correspondence between the identifier of the first data flowcell and the number of the first target sampling path, and the forwarding module is further configured to, when the identifier of the second data flowcell is the same as the identifier of the first data flowcell, determine the first target sampling path according to the identifier of the second data flowcell and the correspondence that is stored by the storage module, and forward the second data packet using the first target sampling path.

According to a third aspect, a switch is provided, and the switch may include a memory and a processor.

The memory is configured to store a set of program code.

The processor is configured to invoke the program code stored in the memory, to execute the following operations of collecting, according to a preset sampling period, congestion extents of d sampling paths in n paths that are from the processor to a destination switch, and storing, using the memory, congestion extent indication information that is of each sampling path and that is obtained by means of collection, where d is less than n, when forwarding a first data packet of a data stream, selecting, from the d sampling paths according to the congestion extent indication information, a first target sampling path with a smallest congestion extent at a first time point, forwarding the first data packet using the first target sampling path, and storing, using the memory, an identifier of a first data flowcell to which the first data packet belongs, when forwarding a second data packet of the data stream, determining whether an identifier of a second data flowcell to which the second data packet belongs is the same as the identifier of the first data flowcell, and forwarding the second data packet using the first target sampling path when the identifier of the second data flowcell is the same as the identifier of the first data flowcell, or when the identifier of the second data flowcell is different from the identifier of the first data flowcell, selecting, from the d sampling paths according to the congestion extent indication information, a second target sampling path with a smallest congestion extent at a second time point, and forwarding the second data packet using the second target sampling path.

With reference to the third aspect, in a first possible implementation, the processor is further configured to randomly select, according to the preset sampling period, the d sampling paths from the n paths that are from the processor to the destination switch, and send d sampling probes that are in a one-to-one correspondence with the d sampling paths to the destination switch, and receive a feedback probe that is of each sampling probe in the d sampling probes and that is fed back by the destination switch, and obtain the congestion extent indication information that is of each sampling path and that is carried in the feedback probe of each sampling probe.

With reference to the first possible implementation of the third aspect, in a second possible implementation, the processor is further configured to, when n is less than a first preset threshold, randomly select d1 sampling paths from the n paths according to the preset sampling period, or when n is greater than or equal to a first preset threshold, randomly select d2 sampling paths from the n paths according to the preset sampling period, where d1 is less than d2, and d2 is less than n.

With reference to the second possible implementation of the third aspect, in a third possible implementation, the sampling probe or the feedback probe of the sampling probe is a data packet in a specified format, the data packet in the specified format includes a probe header, and a first quantity of bits included in the probe header are used to identify a sampling path number, and a second quantity of bits included in the probe header are used to identify congestion extent indication information of a sampling path.

With reference to the third possible implementation of the third aspect, in a fourth possible implementation, the congestion extent indication information of the d sampling paths includes a congestion extent level of each sampling path in the d sampling paths, the congestion extent level of each sampling path is determined by a sum of queue lengths of intermediate switches on the sampling path, and the intermediate switch is a switch other than the source switch and the destination switch on the sampling path.

With reference to any one of the third aspect to the fourth possible implementation of the third aspect, in a fifth possible implementation, the processor is further configured to split the data stream into at least one data flowcell of a preset data size according to a time sequence, where each data flowcell in the at least one data flowcell includes at least one data packet, and add an identifier of each data flowcell in the at least one data flowcell, and add, to each data packet included in each data flowcell, the identifier of the data flowcell to which the data packet belongs.

With reference to the fifth possible implementation of the third aspect, in a sixth possible implementation, the identifier of each data flowcell includes at least one of identification information of the data stream or a number of each data flowcell in the data stream, and the identification information of the data stream includes at least one of a source IP address, a source port, a destination IP address, a destination port, or a protocol number.

With reference to the sixth possible implementation of the third aspect, in a seventh possible implementation, the processor is further configured to store a number of the first target sampling path using the memory, and establish a correspondence between the identifier of the first data flowcell and the number of the first target sampling path, and when the identifier of the second data flowcell is the same as the identifier of the first data flowcell, determine the first target sampling path according to the identifier of the second data flowcell and the correspondence, and forward the second data packet using the first target sampling path.

In this application, before forwarding the data stream to the destination switch, the source switch may preselect sampling paths in all paths that are from the source switch to the destination switch, collect the congestion programs of the sampling paths according to the preset sampling period, and store the congestion program indication information of each sampling path in local storage of the source switch such that scalability of network congestion awareness is improved. When forwarding the data stream, the source switch forwards data in data flowcells, each data flowcell includes one or more data packets, and all data packets that belong to a same data flowcell are forwarded on a same sampling path. When forwarding the first data packet of each data flowcell, the source switch may search, according to a current time point at which the data packet is forwarded, the local storage for a target sampling path with a smallest network congestion program at a current time point, and forward the data packet using the target sampling path. When a same sampling path is a path with a smallest congestion extent in multiple preset sampling periods, different data flowcells may be forwarded on the same sampling path, that is, when the first data packet of each data flowcell is forwarded, the path with a smallest congestion extent at a current time point is selected for forwarding. When paths with a smallest network congestion extent that are collected in different preset sampling periods are different, and forwarding duration of a data flowcell is greater than a length of a sampling period, different data flowcells are forwarded on different sampling paths such that applicability of data packet forwarding is improved, and network load balancing is better implemented.

BRIEF DESCRIPTION OF DRAWINGS

To describe the technical solutions in some of the embodiments of the present application more clearly, the following briefly describes the accompanying drawings describing some of the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

Figure 1:
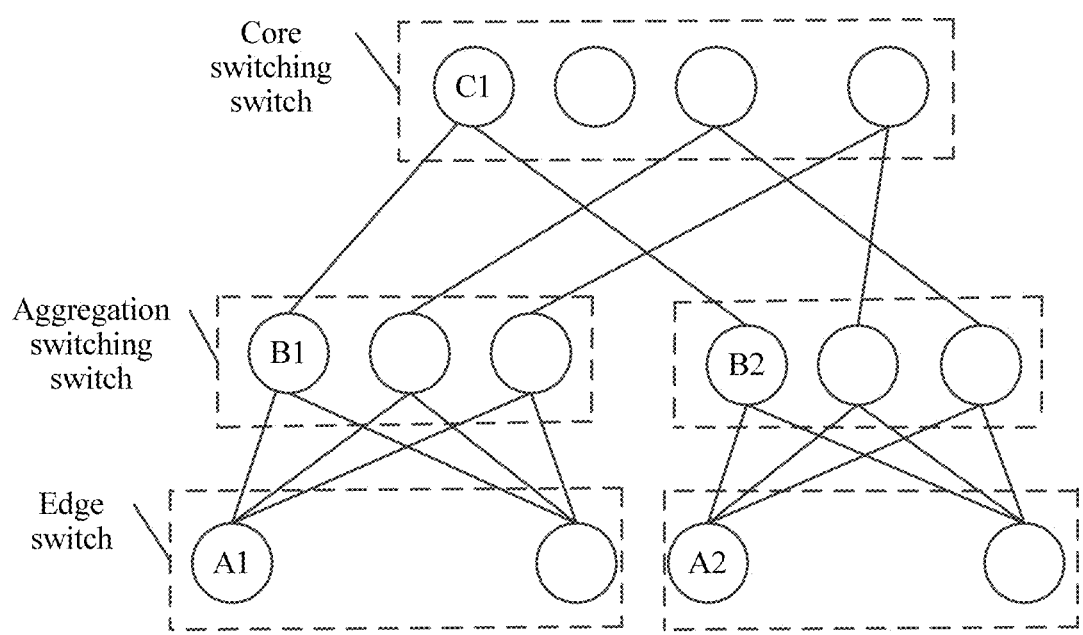
FIG. 1 is a schematic diagram of a data stream routing path according to an embodiment of the present application.

In a specific implementation, a switch provided in embodiments of the present application includes a source switch, a destination switch, and an intermediate switch, and may be a server cabinet access switch, that is, a top of rack (ToR) switch. The intermediate switch is another switch other than the source switch and the destination switch in all switches included on a data stream routing path. As shown in FIG. 1, FIG. 1 is a schematic diagram of a data stream routing path according to an embodiment of the present application. A path from an edge switch A1 (a source switch) to an edge switch A2 is A1→B1→C1→B2→A2. Aggregation switching switches B1 and B2 and a core switching switch C1 are intermediate switches.

The embodiments of the present application relate to data routing control based on a data plane, a data routing control action is performed on a switch layer, and a to-be-resolved problem is how to implement load balancing in a data center network. Further, in the embodiments of the present application, when a data stream routing request is received, forwarding of a data stream is converted to forwarding of a data flowcell. Further, when each data flowcell is forwarded, a target path is selected, according to a load status of each path in all paths that are from a source switch to a destination switch and that are of data stream routing in the data center network to forward the data flowcell. Different data flowcells of a same data stream may be forwarded on different paths. Further, a target path may be determined according to a congestion extent of each path when each data flowcell is forwarded, and congestion extents of different paths are determined by load statuses of switches on the paths such that load balancing in the data center network can be implemented. A flowcell (or a flowlet) herein is a data packet sequence including data packets, and a total quantity of bytes of the data packet sequence is generally far less than a total quantity of bytes of a data stream. With reference to FIG. 2 to FIG. 8, the following describes in detail a data packet forwarding method and apparatus provided in the embodiments of the present application.

Figure 2:
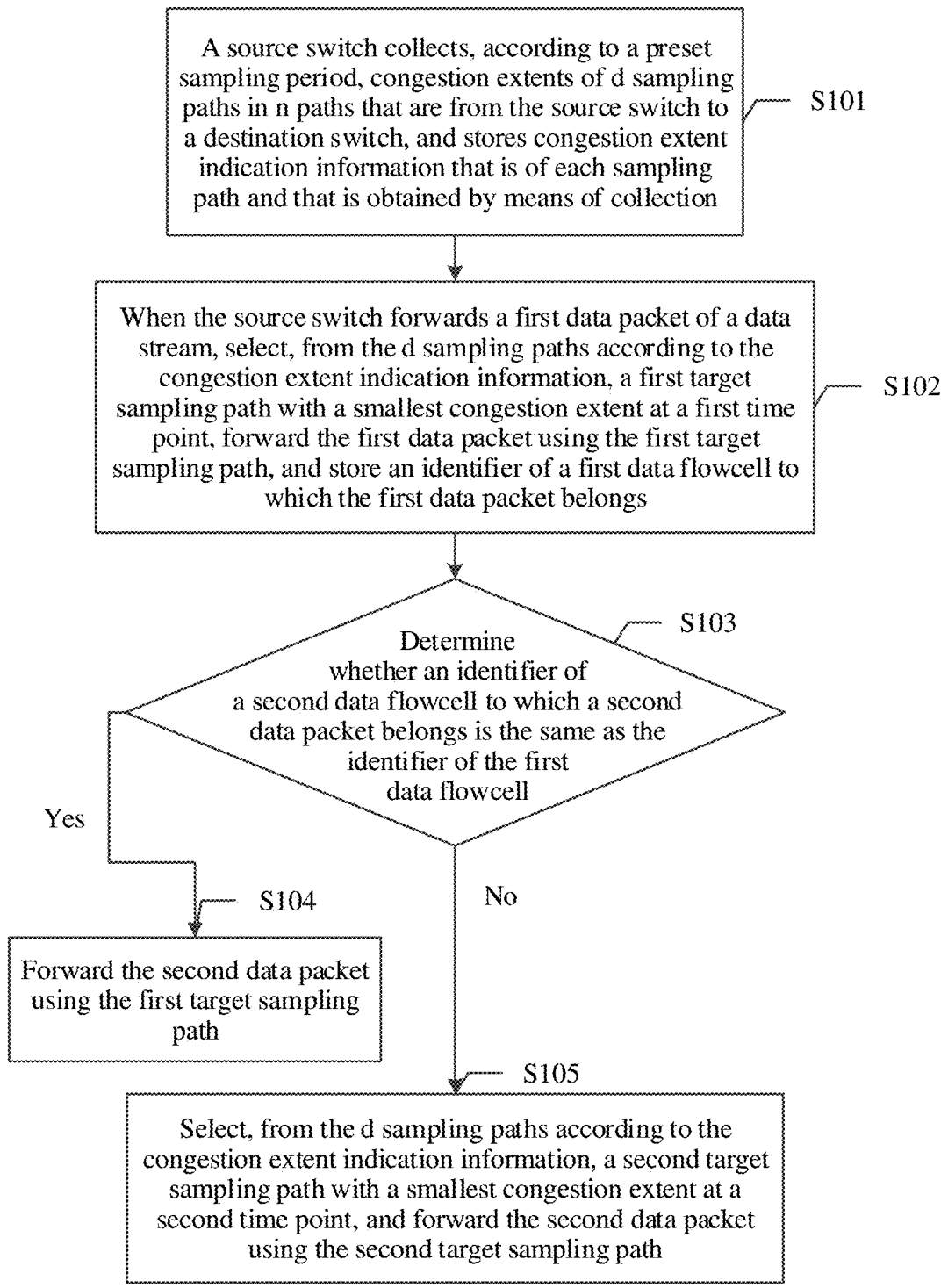
FIG. 2 is a schematic flowchart of a data packet forwarding method according to an embodiment of the present application.

Referring to FIG. 2, FIG. 2 is a schematic flowchart of a data packet forwarding method according to an embodiment of the present application. The method provided in this embodiment of the present application includes the following steps.

Step S101. A source switch collects, according to a preset sampling period, congestion extents of d sampling paths in n paths that are from the source switch to a destination switch, and stores congestion extent indication information that is of each sampling path and that is obtained by means of collection.

In some feasible implementations, before forwarding data to another switch, a switch in a data network may periodically probe a congestion extent of an end-to-end path that is from a local switch to any other switch, and maintain a record table of a path congestion extent in local storage of the local switch in order to record a congestion extent of an end-to-end path between two switches. Therefore, in a routing process of a data stream, a path with a smallest congestion extent at a current time point is selected from the record table of a path congestion extent according to a routing time of each data flowcell to forward the data flowcell. In this embodiment of the present application, a switch may sample a path according to a preset sampling period, that is, select some paths from paths of a whole network to perform path detection, instead of sampling all paths in the whole network. Therefore, complexity of path sampling is reduced, overheads are reduced, and feasibility of extending a method for implementing network load balancing using path sampling to a large-scale network is high.

In some feasible implementations, it is assumed that there are n end-to-end paths that are from any switch (which is assumed as a source switch) in a data network to any other switch (which is assumed as a destination switch) in the network, where n is an integer greater than or equal to 2. The source switch may randomly select d sampling paths from the n paths according to a preset sampling period to perform path congestion extent detection, where d is an integer less than n. In a specific implementation, when a quantity (that is, n) of available paths between the source switch and the destination switch is less than a first preset threshold, when the sampling period arrives, d1 sampling paths may be randomly selected from the n available paths to perform path congestion extent detection, or when a quantity (that is, n) of available paths between the source switch and the destination switch is greater than or equal to a first preset threshold, when the sampling period arrives, d2 sampling paths may be randomly selected from the n available paths to perform path congestion extent detection, where d1 is less than d2, and both d1 and d2 are less than n. It should be noted that when the source switch selects a sampling path according to the preset sampling period, d sampling paths may be randomly selected in each sampling period. The d sampling paths that are randomly selected in different sampling periods may be the same, or may be different. This may be determined according to a result of random sampling, and no limitation is imposed thereto. For example, when the data network is a small-scale network, that is, the quantity (that is, n) of available paths between the source switch and the destination switch in the network is less than 200 (that is, the first preset threshold), two sampling paths may be selected form the n paths, that is, d is 2 (which is assumed as d1). When the data network is a large-scale network, that is, the quantity (that is, n) of available paths between the source switch and the destination switch in the network is greater than or equal to 200 (that is, the first preset threshold), three sampling paths may be selected form the n paths, that is, d is 3 (which is assumed as d2). It should be noted that when the data network is a large-scale network, a quantity of selected sampling paths may be four or five, that is, may be any numerical value that is greater than or equal to 2, and less than or equal to 5. That is, in this embodiment of the present application, the quantity of sampling paths may be determined according to a scale of the data network such that an operation is flexible, and applicability is higher.

In some feasible implementations, after randomly selecting the d sampling paths, the source switch may send d sampling probes to the destination switch. Each sampling path corresponds to one sampling probe, that is, each sampling probe in the d sampling probes is configured to probe a congestion extent of one sampling path. Further, the sampling probe is a data packet in a specified format. A length of the sampling probe is 38 bytes, including an Ethernet header of 14 bytes, a probe header of four bytes, and an IP header of 20 bytes. The Ethernet header and the IP header are the same as an Ethernet header and an IP header that are included in another common data packet, and the probe header is a field distinguished from another common data packet. 24 bits in the four bytes of the probe header are used to identify a path number (including a sampling path), and eight bits in the four bytes of the probe header are used to identify congestion extent indication information of a path (including a sampling path). The 24 bits that are used to identify the path number determine a to-be-sampled sampling path in all paths that connect the source switch and the destination switch. The 24 bits may be numbered to represent more than sixteen million (the $24^{th}$ power of 2) numbers, that is, a total quantity of paths that can be identified by the numbered 24 bits is greater than sixteen million such that a requirement of a large-scale network scenario can be met, and applicability is high. In this embodiment of the present application, the provided congestion extent indication information of a sampling path may be a congestion extent level of a sampling path, that is, the congestion extent indication information of a sampling path may be quantized to multiple congestion extent ranks (that is, congestion extent levels), and each congestion extent rank is indicated by an identifier. For example, a lowest congestion extent rank may be indicated by an identifier 0, and a highest congestion extent rank may be indicated by a maximum identifier. A quantity of identifiers obtained by encoding the eight bits that are used to identify the congestion extent indication information of a path may be up to 256 (the eighth power of 2). The identifier 0 is used to identify the lowest congestion extent rank (that is, a congestion extent level 0), and an identifier 255 is used to identify the highest congestion extent rank (that is, a congestion extent level 255).

In some feasible implementations, the source switch sends a sampling probe corresponding to a sampling path to the destination switch, for example, a sampling probe 1 corresponding to a sampling path 1. When the sampling probe 1 passes through each intermediate switch on the sampling path 1, each intermediate switch adds a queue length of the intermediate switch to a QCM field (that is, a field corresponding to eight bits that are used to identify the congestion extent indication information) of the sampling probe 1 by means of mapping. In this embodiment of the present application, a manner of quantizing a queue length of a switch is used to represent a congestion extent level of a sampling path. For example, when a sum of queue lengths of the intermediate switches on the sampling path 1 is any numerical value from 0 to 10, that is, a queue of a switch stores any multiple data packets whose quantity is from 0 to 10 (for example, 10 data packets), a queue length of a switch may be quantized to a first length rank, which is used to identify a congestion extent level 0. That is, the congestion extent level 0 represents that the sum of the queue lengths of the intermediate switches on the sampling path 1 is less than or equal to 10 data packets. When a sum of queue lengths of the intermediate switches on the sampling path 1 is any numerical value from 11 to 20, that is, a queue of a switch stores any multiple data packets whose quantity is from 11 to 20 (for example, 15 data packets), a queue length of a switch may be quantized to a second length rank, which is used to identify a congestion extent level 1. That is, the congestion extent level 1 represents that the sum of the queue lengths of the intermediate switches on the sampling path 1 is greater than or equal to 11 data packets, and less than or equal to 20 data packets. By analogy, a value range that is of the sum of the queue lengths of the intermediate switches on the sampling path and that is represented by each congestion extent level may be set, and may be further set according to an actual application requirement, and no limitation is imposed thereto.

Figure 3:
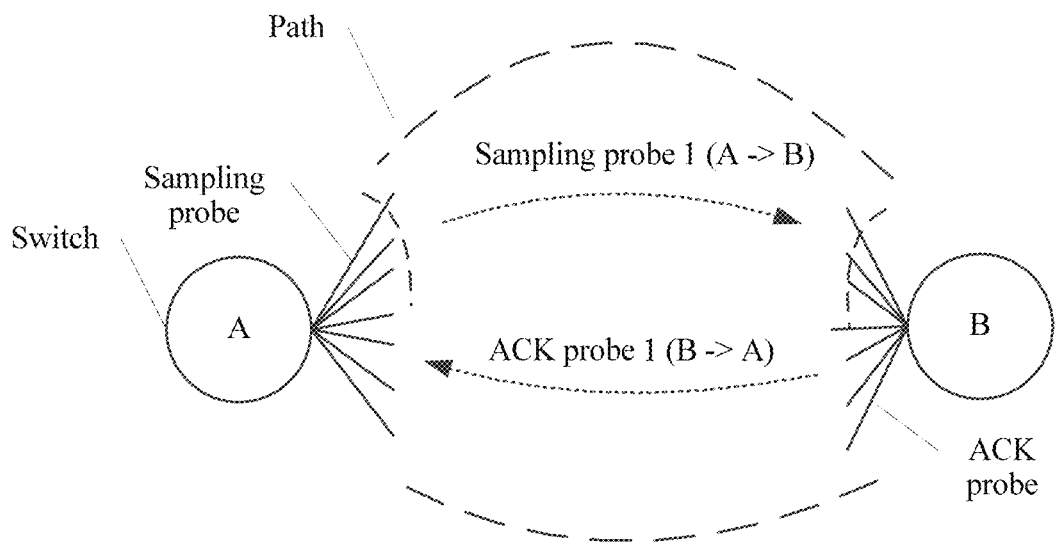
FIG. 3 is a schematic diagram of sending a sampling probe by a source switch to a destination switch.

In some feasible implementations, when a sampling probe arrives at the destination switch, the destination switch generates a feedback probe of the sampling probe. Further, the feedback probe may be an acknowledgement (ACK) probe, and the following uses the ACK probe as an example for description. ACK is an acknowledgement character, and is a transmission control character that is sent by a receive end (for example, the destination switch) to a transmit end (for example, the source switch) in data communication. The ACK represents that data sent by the transmit end is correctly received. Packet content of the ACK probe of the sampling probe is the same as packet content of the sampling probe, and the ACK probe of the sampling probe only needs to exchange a source IP address and a destination IP address in a probe packet. For example, as shown in FIG. 3, FIG. 3 is a schematic diagram of sending a sampling probe by a source switch to a destination switch. There are n paths between a source switch A and a destination switch B. The source switch A selects d sampling paths from the n paths, and sends d sampling probes to the destination switch B. A sampling probe sent on a sampling path 1 may be set as a sampling probe 1. A source IP address in a packet of the sampling probe 1 is an IP address (such as an IP 1) of the source switch A, and a destination IP address is an IP address (such as an IP 2) of the destination switch B, a source IP address in a packet of an ACK probe 1 of the sampling probe 1 is the IP address (such as the IP 2) of the destination switch B, and a destination IP address in the packet of the ACK probe 1 is the IP address (such as the IP 1) of the source switch A. When a congestion extent level indicated by a QCM field included in a packet of a sampling probe (such as the sampling probe 1) that is received by the destination switch is 3, a congestion extent level indicated by a QCM field included in the packet of the ACK probe 1 that is of the sampling probe 1 and that is fed back by the destination switch to the source switch is also 3.

It should be noted that in this embodiment of the present application, a queue length of a switch is used as congestion extent indication information of a network path, and this applies to a feature that a data flowcell in a data stream is more sensitive to a queue length of a switch such that accuracy of congestion extent awareness of a sampling path is improved, thereby improving accuracy for controlling network load balancing of data forwarding.

In a specific implementation, after receiving an ACK probe that is of each sampling probe and that is fed back by the destination switch, the source switch may obtain a path identifier such as a path number of each sampling path and the congestion extent indication information of the sampling path from the ACK probe of each sampling probe. The congestion extent indication information of each sampling path is a congestion extent level indicated by a QCM field in each ACK probe. Further, after obtaining the congestion extent indication information of each sampling path, the source switch may record the sampling path and a congestion extent level corresponding to the sampling path into local storage space of the source switch. Further, the source switch may store a status table of the sampling path in the local storage space of the source switch, and as shown in the following Table 1, may set a storage validity period of a congestion extent level of each sampling path. When a storage time of the congestion extent level of the sampling path exceeds the preset storage validity period, path sampling and congestion extent detection of a sampling path may be performed again. The storage validity period of the congestion extent level of the sampling path is a single period length of the preset sampling period in which the source switch collects a congestion extent of a path. The source switch performs the path sampling and the congestion extent detection of a sampling path according to the preset sampling period such that a congestion extent of a sampling path stored in Table 1 that is stored in the local storage space may be updated in time, accuracy of status detection of the sampling path may be maintained, and accuracy of data forwarding is improved.

TABLE 1

| Destination Switch Identifier | Path Identifier | QCM Field |
|---|---|---|
| B | 1 | 3 |
| ... | ... | ... |
| D | | k |

The destination switch identifier may be an identifier such as an IP address of the destination switch, the path identifier may be an identifier such as a path number, and the QCM field may be a quantized rank of a queue length of an intermediate switch on a sampling path, where k is greater than 0 and less than 255.

In some feasible implementations, the preset sampling period may be any numerical value from 20 µs to 60 µs. For example, when 40 µs is selected as the sampling period, in different network load and network topologies, a relatively good network performance indicator may be obtained, and therefore the preset sampling period may be determined as 40 µs. The network performance indicator may be a flow completion time (FCT), that is, a time for completing data stream transmission. In a specific implementation, the preset sampling period may be determined by calculating the preset sampling period using an exploration-based adaptive method. Further, a relatively small measurement value may be preselected as the sampling period. When an effect of a network performance indicator that is obtained in the sampling period is similar to an effect of a network performance indicator that is obtained in real time, the measurement value may be increased for further testing. When an effect of network performance that is obtained using an increased measurement value is still close to the effect of the network performance indicator that is obtained in real time, the measurement value may be continually increased. When a decreasing amplitude of network performance exceeds an alarm value due to an increased measurement value, the measurement value is no longer increased, and the measurement value before being increased is determined as the sampling period. According to the exploration-based adaptive method, the sampling period may be determined using multiple experiment tests, and the sampling path is sampled using the sampling period such that better network performance is obtained, and applicability of a sampling method is improved.

Step S102. When the source switch forwards a first data packet of a data stream, select, from the d sampling paths according to the congestion extent indication information, a first target sampling path with a smallest congestion extent at a first time point, forward the first data packet using the first target sampling path, and store an identifier of a first data flowcell to which the first data packet belongs.

In some feasible implementations, when receiving a data stream routing request, the source switch may first split a data stream into one or more data flowcells, and each data flowcell includes one or more data packets. In a specific implementation, each data packet in the data stream has a routing forwarding time sequence of the data packet. According to a size and a routing forwarding time sequence of each data packet, the source switch may split, according to the time sequence, one data packet in the data stream into one data flowcell, or split multiple data packets with adjacent time sequences in the data stream into one data flowcell. A sum of sizes of data packets included in each data flowcell is less than or equal to 64 KB.

Further, the source switch may further add a data flowcell identifier to each data flowcell that is obtained by splitting the data stream, and add, to each data packet included in each data flowcell, an identifier of a data flowcell to which the data packet belongs. The data flowcell identifier includes information such as identification information of the data stream and a number of each data flowcell that is sorted in the data stream according to the time sequence. The identification information of the data stream includes a source IP address, a source port, a destination IP address, a destination port, a protocol number, and the like, and no limitation is imposed thereto.

In some feasible implementations, after splitting the data stream, the source switch may forward each data packet in the data stream according to the time sequence. When forwarding a first data packet (for example, the first data packet in the data stream) in the data stream, the source switch may select, from sampling paths recorded in the status table and according to the status table that is of the sampling path and that is stored in the local storage space, a sampling path with a smallest congestion extent that is obtained by means of sampling in a sampling period (which is assumed as a first sampling period) that is corresponding to a current time point node (the first time point, that is, a routing forwarding time of the first data packet), and determine the sampling path as a target sampling path (which is assumed as the first target sampling path). The sampling path with the smallest congestion extent may be a sampling path with a lowest congestion extent level, for example, a sampling path 1. After determining the first target sampling path, the source switch may forward the first data packet using the first target sampling path. Further, after forwarding the first data packet on the first target sampling path, the source switch may establish a correspondence between the first data packet and the first target sampling path, and store the correspondence in the local storage space. Further, the source switch may establish a switch flow table in the local storage, and record, in the switch flow table, a number of the first target sampling path and an identifier of the first data packet corresponding to the first target sampling path in order to establish the correspondence between the first data packet and a forwarding path (that is, the first target sampling path) of the first data packet. The identifier of the first data packet includes a data flowcell to which the first data packet belongs and a data stream to which the data flowcell belongs. The data flowcell (which is assumed as a data flowcell 1) to which the first data packet belongs may be marked using an identifier of the data flowcell 1, and the data stream (which is assumed as a data stream 1) to which the data flowcell 1 belongs may further be marked using an identifier of the data stream 1. No limitation is imposed thereto.

In a specific implementation, the correspondence between the first data packet and the first target sampling path is used to determine a forwarding path of another data packet that belongs to the data flowcell to which the first data packet belongs, and the forwarding path of the other data packet that belongs to the data flowcell to which the first data packet belongs is the first target sampling path. For example, the source switch may allocate a sampling path to the data flowcell 1, and each data packet in the data flowcell 1 is forwarded on the sampling path. For allocation of the sampling path to the data flowcell 1 (for example, the first data flowcell), the source switch allocates the sampling path to a data packet when forwarding the first data packet of the data flowcell 1 (for example, the first data packet). No sampling path is allocated to forward another data packet of the data flowcell 1, and the other data packet is continuously forwarded on the sampling path. When a new data packet that is forwarded at another time point is not a data packet of the data flowcell 1, a sampling path is allocated to the new data packet. In this case, the new data packet belongs to another data flowcell (for example, a data flowcell 2), and allocating the sampling path to the new data packet is equivalent to allocating the sampling path to the data flowcell 2. Another data packet of the data flowcell 2 is also forwarded on the sampling path.

Step S103. When the source switch forwards a second data packet of the data stream, determine whether an identifier of a second data flowcell to which the second data packet belongs is the same as the identifier of the first data flowcell, and when a determining result is that the identifier of the second data flowcell is the same as the identifier of the first data flowcell, perform step S104, or when a determining result is that the identifier of the second data flowcell is different from the identifier of the first data flowcell, perform step S105.

Step S104. Forward the second data packet using the first target sampling path.

Step S105. Select, from the d sampling paths according to the congestion extent indication information, a second target sampling path with a smallest congestion extent at a second time point, and forward the second data packet using the second target sampling path.

In some feasible implementations, after the source switch forwards the first data packet and records the data flowcell to which the first data packet belongs, when a time node for forwarding a next data packet (which is assumed as the second data packet) arrives, the source switch may first determine whether the second data packet belongs to the data flowcell (for example, the data flowcell 1) to which the first data packet belongs. Further, the source switch may determine, according to an identifier of a data flowcell (which is assumed as the second data flowcell) carried in the second data packet, whether the identifier of the second data flowcell is the same as the identifier of the first data flowcell. When the identifier of the second data flowcell is the same as the identifier of the first data flowcell, it can be determined that the second data flowcell is the first data flowcell, that is, the second data packet is a data packet included in the first data flowcell. After determining that the second data packet belongs to the first data flowcell, the source switch may query the switch flow table, and search, according to the correspondence between the identifier of the first data flowcell and the number of the first target sampling path, the switch flow table for the number of the first target sampling path corresponding to the first data flowcell, and does not need to query a congestion status of a network path such that data packet forwarding efficiency can be improved, and power consumption is reduced. After finding the number of the first target sampling path, the source switch may forward the second data packet on the first target sampling path.

Further, when the identifier of the second data flowcell is different from the identifier of the first data flowcell, it can be determined that the second data flowcell is not the first data flowcell, that is, the second data packet does not belong to the first data flowcell. In this case, the source switch may determine that the second data packet is a data packet of another data flowcell, query, according to a current time point node (the second time point, that is, a routing forwarding time of the second data packet), a congestion extent that is of each sampling path and that is obtained by means of detection in the current sampling period from the status table that is of the congestion extent of the sampling path and that is stored in the local storage space, and select a sampling path (which is assumed as the second target sampling path) with a smallest congestion extent (that is, a lowest congestion extent level) that is obtained by means of detection in the current sampling period to forward the second data packet. It should be noted that the first sampling period and a second sampling period may be a same sampling period, or may be different sampling periods. This may be determined according to a time length of a sampling period and a forwarding time interval between the first data packet and the second data packet, and no limitation is imposed thereto. That is, the first data flowcell and the second data flowcell may be forwarded on a same sampling path, or may be forwarded on different sampling paths. This may be determined according to a congestion extent of each sampling path in an actual application scenario, and no limitation is imposed thereto.

Further, in some feasible implementations, when the second data packet does not belong to the data stream to which the first data packet belongs, a path may be randomly selected to forward the second data packet, or data splitting and forwarding processing is performed according to a new data stream. For details, refer to the foregoing implementation, and details are not described herein.

In some feasible implementations, a data routing solution used in this embodiment of the present application is not limited to an existing source routing solution. That is, when forwarding a data packet, the source switch may convert a path number of a selected sampling path to a label sequence, and associate a label in the label sequence with a port of each switch on the selected sampling path. The source switch writes the label sequence into a data stream header. When the data packet arrives at a switch, the switch may simply and automatically forward the data packet to a port according to a label in the header in order to forward the data packet.

In this embodiment of the present application, the source switch may sample a congestion extent of a valid path in a network. When there is a data stream routing request, a data stream is split into multiple data flowcells, and sampling path congestion aware routing is performed on the data flowcells obtained by means of splitting. A method for sampling a valid path used in this embodiment of the present application effectively reduces solution complexity and extra overheads such that scalability is high, and applicability of data forwarding routing is enhanced.

Figure 4:
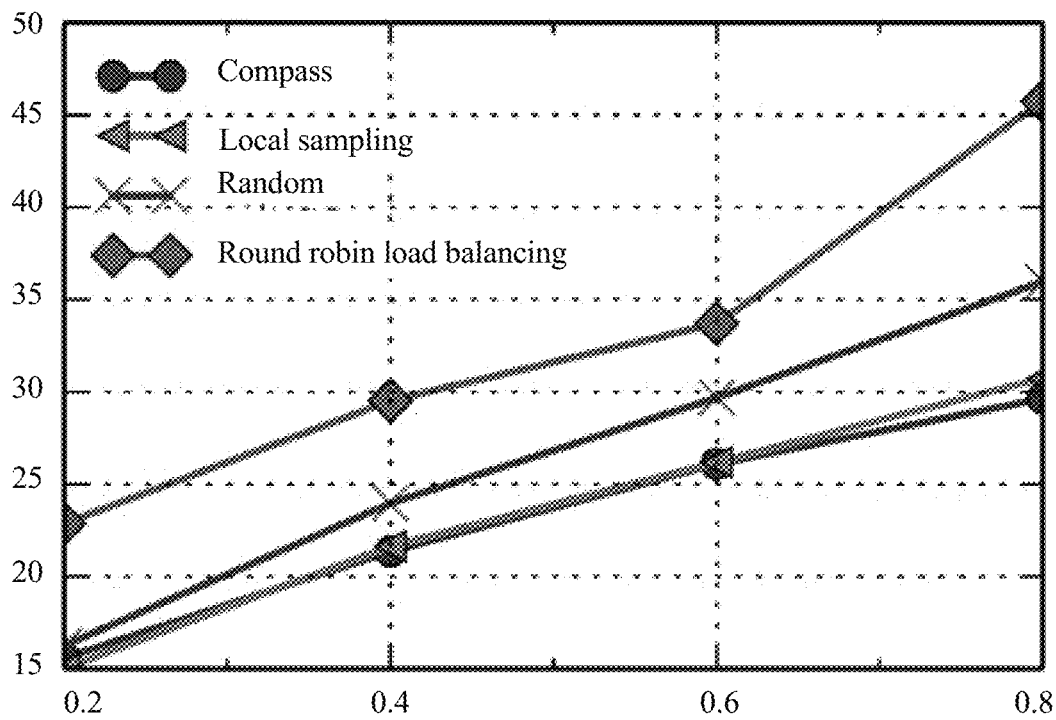
FIG. 4 is a schematic diagram of a data packet forwarding effect according to an embodiment of the present application.

Referring to FIG. 4, FIG. 4 is a schematic diagram of a data packet forwarding effect according to an embodiment of the present application. As shown in the figure, this embodiment of the present application uses a normalized FCT as a main performance indicator of data forwarding. In this embodiment of the present application, effects of data forwarding in four different data forwarding routing manners are compared, and normalized FCTs of 99% mice flows (that is, a data stream whose traffic is from 0 KB to 64 KB) in a network may be compared. FIG. 4 shows effects of data forwarding in different load balancing solutions in a data mining service in cases such as when network load is 0.2 to 0.8. That the network load is 0.2 to 0.8 represents a ratio of traffic load to full load in a network. For example, that the network load is 1 represents that the current traffic load of the network is the full load, and that the network load is 0.2 represents that the traffic load of the network is 20% of the full load. The different load balancing solutions include a compass load balancing solution, a local sampling load balancing solution (that is, the data packet forwarding solution described in the foregoing embodiment of the embodiments of the present application), a random routing load balancing solution, a round robin load balancing solution, and the like.

In FIG. 4, a horizontal coordinate is load, and a vertical coordinate is a normalized FCT. In an application scenario of the data mining service, normalized FCTs obtained in different network load in different load balancing solutions shown in the figure are different. For details, refer to the following Table 2. Table 2 is a data record table of normalized FCTs obtained in different network load in various load balancing solutions.

TABLE 2

| Network load | Solution | | | |
|---|---|---|---|---|
| | Compass | Local Sampling | Random | Round Robin Load Balancing |
| 0.2 | 15.57 | 15.00 | 16.25 | 22.86 |
| 0.4 | 21.35 | 21.63 | 23.96 | 29.52 |
| 0.6 | 26.09 | 26.18 | 29.68 | 33.70 |
| 0.8 | 29.64 | 30.74 | 35.97 | 45.73 |

It can be learned from the data shown in Table 2 that compared with the round robin load balancing, the local sampling solution provided in this embodiment of the present application can improve performance by 22% to 35% in the application scenario of the data mining service, and compared with the random policy, can improve the performance by 4% to 17%. A method for sampling a valid path used in this embodiment of the present application effectively reduces solution complexity and extra overheads such that scalability is high, and applicability is high.

Figure 5:
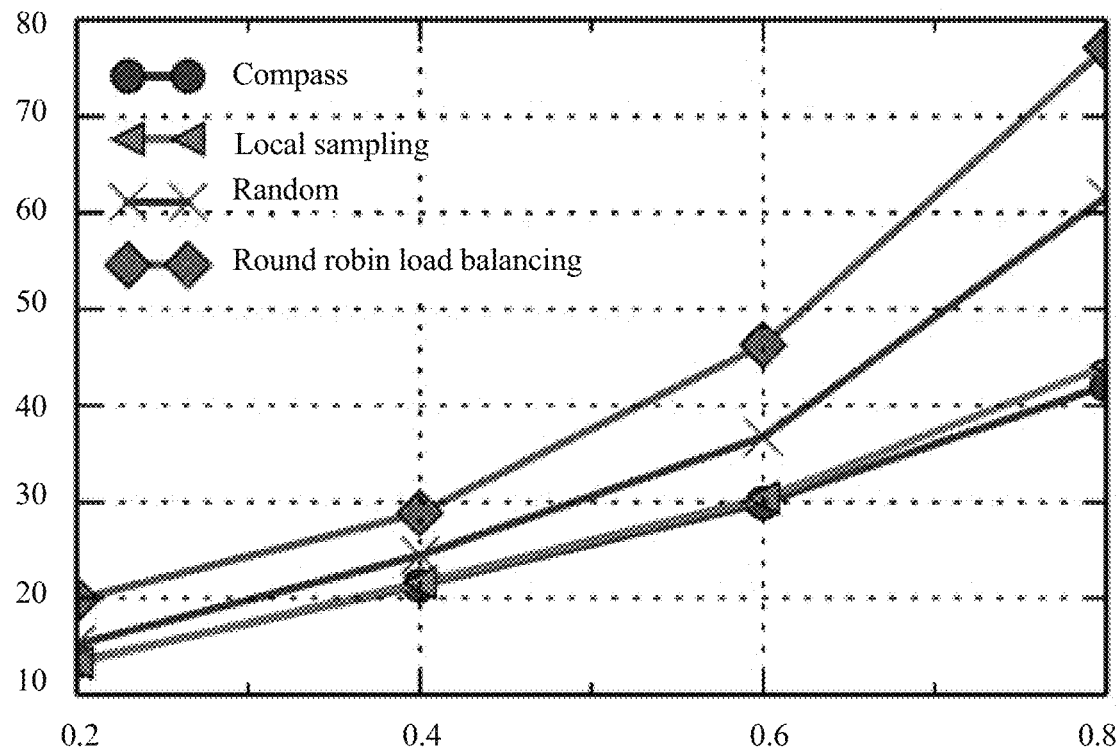
FIG. 5 is a schematic diagram of another data packet forwarding effect according to an embodiment of the present application.

Referring to FIG. 5, FIG. 5 is a schematic diagram of another data packet forwarding effect according to an embodiment of the present application. As shown in the figure, this embodiment of the present application uses a normalized FCT as a main performance indicator of data forwarding. In this embodiment of the present application, effects of data forwarding in four different data forwarding routing manners are compared, and normalized FCTs of 99% mice flows in a network may be compared. FIG. 5 shows effects of data forwarding in different load balancing solutions in a network searching scenario when network load is 0.2 to 0.8. That the network load is 0.2 to 0.8 represents a ratio of traffic load to full load in a network. For example, that the network load is 1 represents that the current traffic load of the network is the full load, and that the network load is 0.2 represents that the traffic load of the network is 20% of the full load. The different load balancing solutions include a compass load balancing solution, a local sampling load balancing solution (that is, the data packet forwarding solution described in the foregoing embodiment of the embodiments of the present application), a random routing load balancing solution, a round robin load balancing solution, and the like.

In FIG. 5, a horizontal coordinate is load, and a vertical coordinate is a normalized FCT. In an application scenario of network searching, normalized FCTs obtained in different network load in different load balancing solutions shown in the figure are different. For details, refer to the following Table 3. Table 3 is a data record table of normalized FCTs obtained in different network load in various load balancing solutions.

TABLE 3

| Network load | Solution | | | |
|---|---|---|---|---|
| | Compass | Local Sampling | Random | Round Robin Load Balancing |
| 0.2 | 13.42 | 13.28 | 15.18 | 19.84 |
| 0.4 | 21.31 | 21.59 | 24.43 | 28.84 |
| 0.6 | 29.86 | 30.38 | 36.72 | 46.28 |
| 0.8 | 42.08 | 44.11 | 61.63 | 77.14 |

It can be learned from the data shown in Table 3 that compared with the round robin load balancing, the local sampling solution provided in this embodiment of the present application can improve performance of a mice FCT in a network searching service by 26% to 45%, and compared with the random policy, can improve the performance of a mice FCT in a network searching service by 11% to 31%. A method for sampling a valid path used in this embodiment of the present application effectively reduces solution complexity and extra overheads such that scalability is high, and applicability is high.

Figure 6:
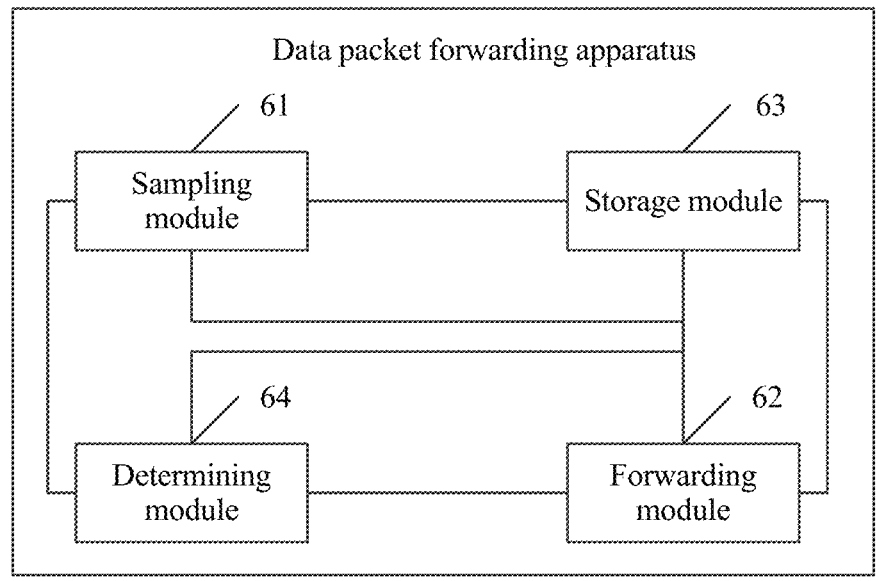
FIG. 6 is a schematic structural diagram of a data packet forwarding apparatus according to an embodiment of the present application.

Referring to FIG. 6, FIG. 6 is a schematic structural diagram of a data packet forwarding apparatus according to an embodiment of the present application. The apparatus provided in this embodiment of the present application includes a sampling module 61 configured to collect, according to a preset sampling period, congestion extents of d sampling paths in n paths that are from a source switch to a destination switch, and store congestion extent indication information that is of each sampling path and that is obtained by means of collection, where d is less than n, a forwarding module 62 configured to, when forwarding a first data packet of a data stream, select, from the d sampling paths according to the congestion extent indication information that is collected by the sampling module 61, a first target sampling path with a smallest congestion extent at a first time point, and forward the first data packet using the first target sampling path, a storage module 63 configured to store an identifier of a first data flowcell to which the first data packet that is forwarded by the forwarding module 62 belongs, and a determining module 64 configured to, before the forwarding module 62 forwards a second data packet of the data stream, determine whether an identifier of a second data flowcell to which the second data packet belongs is the same as the identifier of the first data flowcell that is stored in the storage module 63.

The forwarding module 62 is further configured to, when a determining result of the determining module 64 is that the identifier of the second data flowcell is the same as the identifier of the first data flowcell, forward the second data packet using the first target sampling path.

The forwarding module 62 is further configured to, when the determining result of the determining module 64 is that the identifier of the second data flowcell is different from the identifier of the first data flowcell, select, from the d sampling paths according to the congestion extent indication information that is collected by the sampling module, a second target sampling path with a smallest congestion extent at a second time point, and forward the second data packet using the second target sampling path.

In some feasible implementations, the sampling module 61 is further configured to randomly select, according to the preset sampling period, the d sampling paths from the n paths that are from the source switch to the destination switch, and send d sampling probes that are in a one-to-one correspondence with the d sampling paths to the destination switch, and receive a feedback probe that is of each sampling probe in the d sampling probes and that is fed back by the destination switch, and obtain the congestion extent indication information that is of each sampling path and that is carried in the feedback probe of each sampling probe.

In some feasible implementations, the sampling module 61 is further configured to, when n is less than a first preset threshold, randomly select d1 sampling paths from the n paths according to the preset sampling period, or when n is greater than or equal to a first preset threshold, randomly select d2 sampling paths from the n paths according to the preset sampling period, where d1 is less than d2, and d2 is less than n.

In some feasible implementations, the sampling probe or the feedback probe of the sampling probe is a data packet in a specified format, the data packet in the specified format includes a probe header, and a first quantity of bits included in the probe header are used to identify a sampling path number, and a second quantity of bits included in the probe header are used to identify congestion extent indication information of a sampling path.

In some feasible implementations, the congestion extent indication information of the d sampling paths includes a congestion extent level of each sampling path in the d sampling paths, the congestion extent level of each sampling path is determined by a sum of queue lengths of intermediate switches on the sampling path, and the intermediate switch is a switch other than the source switch and the destination switch on the sampling path.

Figure 7:
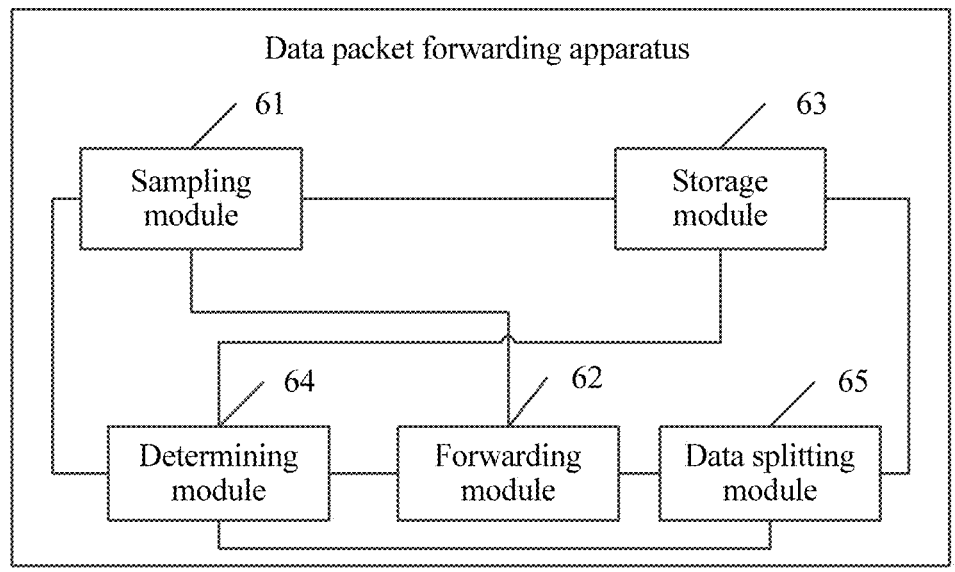
FIG. 7 is another schematic structural diagram of a data packet forwarding apparatus according to an embodiment of the present application.

In some feasible implementations, referring to FIG. 7, FIG. 7 is another schematic structural diagram of an apparatus according to an embodiment of the present application, and the apparatus provided in this embodiment of the present application further includes a data splitting module 65 configured to, before the forwarding module 62 forwards the first data packet of the data stream, split the data stream into at least one data flowcell of a preset data size according to a time sequence, where each data flowcell in the at least one data flowcell includes at least one data packet.

The data splitting module 65 is further configured to add an identifier of each data flowcell in the at least one data flowcell, and add, to each data packet included in each data flowcell, the identifier of the data flowcell to which the data packet belongs.

In some feasible implementations, the identifier of each data flowcell includes at least one of identification information of the data stream or a number of each data flowcell in the data stream, and the identification information of the data stream includes at least one of a source IP address, a source port, a destination IP address, a destination port, or a protocol number.

In some feasible implementations, the storage module 63 is further configured to store a number of the first target sampling path, and establish a correspondence between the identifier of the first data flowcell and the number of the first target sampling path.

The forwarding module 62 is further configured to, when the identifier of the second data flowcell is the same as the identifier of the first data flowcell, determine the first target sampling path according to the identifier of the second data flowcell and the correspondence that is stored by the storage module, and forward the second data packet using the first target sampling path.

In a specific implementation, the data packet forwarding apparatus may implement, using each built-in module, an implementation described in each step in the data packet forwarding method provided in the embodiments of the present application. For details, refer to description of each step in the foregoing embodiment, and details are not described herein again.

In this application, before forwarding the data stream to the destination switch, the source switch may preselect sampling paths in all paths that are from the source switch to the destination switch, collect the congestion programs of the sampling paths according to the preset sampling period, and store the congestion program indication information of each sampling path in local storage of the source switch such that scalability of network congestion awareness is improved. When forwarding the data stream, the source switch forwards data in data flowcells, each data flowcell includes one or more data packets, and all data packets that belong to a same data flowcell are forwarded on a same sampling path. When forwarding the first data packet of each data flowcell, the source switch may search, according to a current time point at which the data packet is forwarded, the local storage for a target sampling path with a smallest network congestion program at the current time point, and forward the data packet using the target sampling path. When a same sampling path is a path with a smallest congestion extent in multiple preset sampling periods, different data flowcells may be forwarded on the same sampling path, that is, when the first data packet of each data flowcell is forwarded, the path with a smallest congestion extent at a current time point is selected for forwarding. When paths with a smallest network congestion extent that are collected in different preset sampling periods are different, and forwarding duration of a data flowcell is greater than a length of a sampling period, different data flowcells are forwarded on different sampling paths such that applicability of data packet forwarding is improved, and network load balancing is better implemented.

Figure 8:
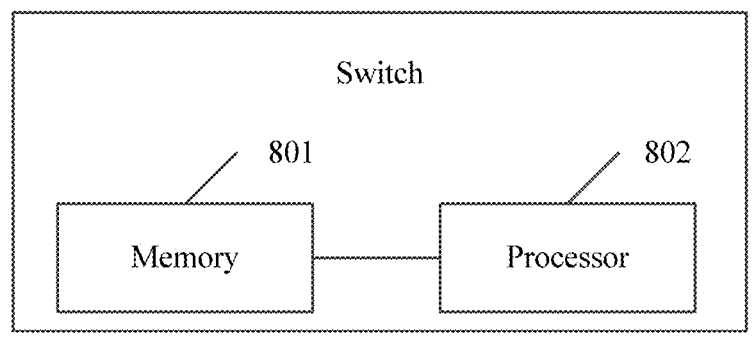
FIG. 8 is a schematic structural diagram of a switch according to an embodiment of the present application.

Referring to FIG. 8, FIG. 8 is a schematic structural diagram of a source switch according to an embodiment of the present application. The switch provided in this embodiment of the present application may be the source switch described in the foregoing embodiment, and the switch may include a memory 801 and a processor 802.

The memory 801 is configured to store a set of program code.

The processor 802 is configured to invoke the program code stored in the memory 801, to execute the following operations of collecting, according to a preset sampling period, congestion extents of d sampling paths in n paths that are from the processor 802 to a destination switch, and storing, using the memory 801, congestion extent indication information that is of each sampling path and that is obtained by means of collection, where d is less than n, when forwarding a first data packet of a data stream, selecting, from the d sampling paths according to the congestion extent indication information, a first target sampling path with a smallest congestion extent at a first time point, forwarding the first data packet using the first target sampling path, and storing, using the memory 801, an identifier of a first data flowcell to which the first data packet belongs, when forwarding a second data packet of the data stream, determining whether an identifier of a second data flowcell to which the second data packet belongs is the same as the identifier of the first data flowcell, and forwarding the second data packet using the first target sampling path when the identifier of the second data flowcell is the same as the identifier of the first data flowcell, or when the identifier of the second data flowcell is different from the identifier of the first data flowcell, selecting, from the d sampling paths according to the congestion extent indication information, a second target sampling path with a smallest congestion extent at a second time point, and forwarding the second data packet using the second target sampling path.

In some feasible implementations, the processor 802 is further configured to randomly select, according to the preset sampling period, the d sampling paths from the n paths that are from the processor 802 to the destination switch, and send d sampling probes that are in a one-to-one correspondence with the d sampling paths to the destination switch, and receive a feedback probe that is of each sampling probe in the d sampling probes and that is fed back by the destination switch, and obtain the congestion extent indication information that is of each sampling path and that is carried in the feedback probe of each sampling probe.

In some feasible implementations, the processor 802 is further configured to, when n is less than a first preset threshold, randomly select d1 sampling paths from the n paths according to the preset sampling period, or when n is greater than or equal to a first preset threshold, randomly select d2 sampling paths from the n paths according to the preset sampling period, where d1 is less than d2, and d2 is less than n.

In some feasible implementations, the sampling probe or the feedback probe of the sampling probe is a data packet in a specified format, the data packet in the specified format includes a probe header, and a first quantity of bits included in the probe header are used to identify a sampling path number, and a second quantity of bits included in the probe header are used to identify congestion extent indication information of a sampling path.

In some feasible implementations, the congestion extent indication information of the d sampling paths includes a congestion extent level of each sampling path in the d sampling paths, the congestion extent level of each sampling path is determined by a sum of queue lengths of intermediate switches on the sampling path, and the intermediate switch is a switch other than the source switch and the destination switch on the sampling path.

In some feasible implementations, the processor 802 is further configured to split the data stream into at least one data flowcell of a preset data size according to a time sequence, where each data flowcell in the at least one data flowcell includes at least one data packet, and add an identifier of each data flowcell in the at least one data flowcell, and add, to each data packet included in each data flowcell, the identifier of the data flowcell to which the data packet belongs.

In some feasible implementations, the identifier of each data flowcell includes at least one of identification information of the data stream or a number of each data flowcell in the data stream, and the identification information of the data stream includes at least one of a source IP address, a source port, a destination IP address, a destination port, or a protocol number.

In some feasible implementations, the processor 802 is further configured to store a number of the first target sampling path using the memory 801, and establish a correspondence between the identifier of the first data flowcell and the number of the first target sampling path, and when the identifier of the second data flowcell is the same as the identifier of the first data flowcell, determine the first target sampling path according to the identifier of the second data flowcell and the correspondence, and forward the second data packet using the first target sampling path.

In a specific implementation, the switch may be the source switch provided in the embodiments of the present application. The source switch may implement, using each built-in module, an implementation described in each step in the data packet forwarding method provided in the embodiments of the present application. For details, refer to description of each step in the foregoing embodiment, and details are not described herein again.

In this application, before forwarding the data stream to the destination switch, the source switch may preselect sampling paths in all paths that are from the source switch to the destination switch, collect the congestion programs of the sampling paths according to the preset sampling period, and store the congestion program indication information of each sampling path in local storage of the source switch such that scalability of network congestion awareness is improved. When forwarding the data stream, the source switch forwards data in data flowcells, each data flowcell includes one or more data packets, and all data packets that belong to a same data flowcell are forwarded on a same sampling path. When forwarding the first data packet of each data flowcell, the source switch may search, according to a current time point at which the data packet is forwarded, the local storage for a target sampling path with a smallest network congestion program at the current time point, and forward the data packet using the target sampling path. When a same sampling path is a path with a smallest congestion extent in multiple preset sampling periods, different data flowcells may be forwarded on the same sampling path, that is, when the first data packet of each data flowcell is forwarded, the path with a smallest congestion extent at a current time point is selected for forwarding. When paths with a smallest network congestion extent that are collected in different preset sampling periods are different, and forwarding duration of a data flowcell is greater than a length of a sampling period, different data flowcells are forwarded on different sampling paths such that applicability of data packet forwarding is improved, and network load balancing is better implemented.

In the specification, claims, and accompanying drawings of the present application, the terms "first," "second," "third," "fourth," and so on are intended to distinguish between different objects but do not indicate a particular order. In addition, the terms "including," "including," or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely example embodiments of the present application, and certainly is not intended to limit the protection scope of the present application. Therefore, equivalent variations made in accordance with the claims of the present application shall fall within the scope of the present application.

What is claimed is:

1. A data packet forwarding method, implemented by a source switch, the data packet forwarding method comprising:
  collecting, according to a preset sampling period, congestion extents of d sampling paths in n paths from the source switch to a destination switch, wherein d is less than n;
  storing congestion extent indication information of each sampling path of the d sampling paths obtained by collection;
  selecting, from the d sampling paths according to the congestion extent indication information of each sampling path, a first target sampling path with a smallest congestion extent at a first time point;
  transmitting a first data packet of a data stream using the first target sampling path;
  storing an identifier of a first data flowcell to which the first data packet belongs;
  determining that a second data packet of the data stream is to be transmitted;
  determining that an identifier of a second data flowcell to which the second data packet belongs is the same as the identifier of the first data flowcell;
  transmitting the second data packet using the first target sampling path in response to determining that the identifier of the second data flowcell is the same as the identifier of the first data flowcell;
  selecting, from the d sampling paths according to the congestion extent indication information of each sampling path, a second target sampling path with a smallest congestion extent at a second time point;
  transmitting the second data packet using the second target sampling path in response to the determining that the identifier of the second data flowcell is different from the identifier of the first data flowcell; and
  forwarding different data flowcells on different sampling paths selected from the d sampling paths when (1) paths with a smallest network congestion extent that are collected in different preset sampling periods are different and (2) a forwarding duration of a data flowcell is greater than a length of a sampling period.

2. The data packet forwarding method of claim 1, wherein collecting the congestion extents comprises:
  randomly selecting, according to the preset sampling period, the d sampling paths from the n paths;
  sending d sampling probes in a one-to-one correspondence with the d sampling paths to the destination switch;
  receiving a feedback probe of each sampling probe in the d sampling probes from the destination switch; and
  obtaining the congestion extent indication information of each sampling path carried in the feedback probe of each sampling probe.

3. The data packet forwarding method of claim 2, wherein randomly selecting the d sampling paths comprises:
  randomly selecting d1 sampling paths from the n paths according to the preset sampling period when n is less than a first preset threshold; and
  randomly selecting d2 sampling paths from the n paths according to the preset sampling period when n is greater than or equal to the first preset threshold, wherein d1 is less than d2, and wherein d2 is less than n.

4. The data packet forwarding method of claim 3, wherein a sampling probe or a feedback probe of the sampling probe is a data packet in a specified format comprising a probe header, wherein a first quantity of bits comprised in the probe header identifies a sampling path number, and wherein a second quantity of bits comprised in the probe header identifies congestion extent indication information of a sampling path.

5. The data packet forwarding method of claim 4, wherein congestion extent indication information of the d sampling paths comprises a congestion extent level of each sampling path in the d sampling paths, wherein the congestion extent level of each sampling path is determined by a sum of queue lengths of intermediate switches on the sampling path, and wherein an intermediate switch is a switch other than the source switch and the destination switch on the sampling path.

6. The data packet forwarding method of claim 1, wherein before transmitting the first data packet, the data packet forwarding method further comprises:
  splitting the data stream into at least one data flowcell of a preset data size according to a time sequence, wherein each data flowcell in the at least one data flowcell comprises at least one data packet;
  adding an identifier to each data flowcell in the at least one data flowcell; and
  adding, to each data packet comprised in each data flowcell, the identifier of the data flowcell to which the data packet belongs.

7. The data packet forwarding method of claim 6, wherein the identifier of each data flowcell comprises at least one of identification information of the data stream or a number of each data flowcell in the data stream, and wherein the identification information of the data stream comprises at least one of a source Internet Protocol (IP) address, a source port, a destination IP address, a destination port, or a protocol number.

8. The data packet forwarding method of claim 7, wherein after storing the identifier of the first data flowcell, the data packet forwarding method further comprises:
  storing a number of the first target sampling path; and
  establishing a correspondence between the identifier of the first data flowcell and the number of the first target sampling path, and
  wherein transmitting the second data packet using the first target sampling path comprises:
    determining the first target sampling path according to the identifier of the second data flowcell and the correspondence when the identifier of the second data flowcell is the same as the identifier of the first data flowcell; and
    transmitting the second data packet using the first target sampling path.

9. A data packet forwarding apparatus, comprising:
  a memory configured to store instructions; and
  a processor coupled to the memory, wherein the instructions cause the processor to be configured to:

collect, according to a preset sampling period, congestion extents of d sampling paths in n paths from a source switch to a destination switch, wherein d is less than n;

store congestion extent indication information of each sampling path of the d sampling paths obtained by collection;

select, from the d sampling paths according to the congestion extent indication information of each sampling path, a first target sampling path with a smallest congestion extent at a first time point to transmit a first data packet of a data stream;

transmit the first data packet using the first target sampling path;

store an identifier of a first data flowcell to which the first data packet belongs;

determine that a second data packet of the data stream is to be transmitted;

determine whether an identifier of a second data flowcell to which the second data packet belongs is the same as the identifier of the first data flowcell;

transmit the second data packet using the first target sampling path when the identifier of the second data flowcell is the same as the identifier of the first data flowcell;

select, from the d sampling paths according to the congestion extent indication information of each sampling path, a second target sampling path with a smallest congestion extent at a second time point;

transmit the second data packet using the second target sampling path when the identifier of the second data flowcell is different from the identifier of the first data flowcell; and forwarding different data flowcells on different sampling paths selected from the d sampling paths when (1) paths with a smallest network congestion extent that are collected in different preset sampling periods are different and (2) a forwarding duration of a data flowcell is greater than a length of a sampling period.

10. The data packet forwarding apparatus of claim 9, wherein the instructions further cause the processor to be configured to:

randomly select, according to the preset sampling period, the d sampling paths from the n paths from the source switch to the destination switch;

send d sampling probes in a one-to-one correspondence with the d sampling paths to the destination switch;

receive a feedback probe of each sampling probe in the d sampling probes from the destination switch; and obtain the congestion extent indication information of each sampling path carried in the feedback probe of each sampling probe.

11. The data packet forwarding apparatus of claim 10, wherein the instructions further cause the processor to be configured to:

randomly select d1 sampling paths from the n paths according to the preset sampling period when n is less than a first preset threshold; and randomly select d2 sampling paths from the n paths according to the preset sampling period when n is greater than or equal to the first preset threshold, wherein d1 is less than d2, and wherein d2 is less than n.

12. The data packet forwarding apparatus of claim 11, wherein a sampling probe or a feedback probe of the sampling probe is a data packet in a specified format comprising a probe header, wherein a first quantity of bits comprised in the probe header identifies a sampling path number, and wherein a second quantity of bits comprised in the probe header identifies congestion extent indication information of a sampling path.

13. The data packet forwarding apparatus of claim 12, wherein congestion extent indication information of the d sampling paths comprises a congestion extent level of each sampling path in the d sampling paths, wherein the congestion extent level of each sampling path is determined by a sum of queue lengths of intermediate switches on the sampling path, and wherein an intermediate switch is a switch other than the source switch and the destination switch on the sampling path.

14. The data packet forwarding apparatus of claim 9, wherein the instructions further cause the processor to be configured to:

split the data stream into at least one data flowcell of a preset data size according to a time sequence before transmitting the first data packet of the data stream, wherein each data flowcell in the at least one data flowcell comprises at least one data packet;

add an identifier to each data flowcell in the at least one data flowcell; and add, to each data packet comprised in each data flowcell, the identifier of the data flowcell to which the data packet belongs.

15. The data packet forwarding apparatus of claim 14, wherein the identifier of each data flowcell comprises at least one of identification information of the data stream or a number of each data flowcell in the data stream, and wherein the identification information of the data stream comprises at least one of a source Internet Protocol (IP) address, a source port, a destination IP address, a destination port, or a protocol number.

16. The data packet forwarding apparatus of claim 15, wherein the instructions further cause the processor to be configured to:

store a number of the first target sampling path;

establish a correspondence between the identifier of the first data flowcell and the number of the first target sampling path;

determine the first target sampling path according to the identifier of the second data flowcell and the correspondence when the identifier of the second data flowcell is the same as the identifier of the first data flowcell; and transmit the second data packet using the first target sampling path.

17. A non-transitory computer readable storage medium having a computer usable program code, wherein a computing device executes the computer usable program code to:

collect, according to a preset sampling period, congestion extents of d sampling paths in n paths from a source switch to a destination switch, wherein d is less than n;

store congestion extent indication information of each sampling path of the d sampling paths obtained by collection;

select, from the d sampling paths according to the congestion extent indication information of each sampling path, a first target sampling path with a smallest congestion extent at a first time point to transmit a first data packet of a data stream;

transmit the first data packet using the first target sampling path;

store an identifier of a first data flowcell to which the first data packet belongs;

determine that a second data packet of the data stream is to be transmitted;

determine whether an identifier of a second data flowcell to which the second data packet belongs is the same as the identifier of the first data flowcell;

transmit the second data packet using the first target sampling path when the identifier of the second data flowcell is the same as the identifier of the first data flowcell;

select, from the d sampling paths according to the congestion extent indication information of each sampling path, a second target sampling path with a smallest congestion extent at a second time point;

transmit the second data packet using the second target sampling path when the identifier of the second data flowcell is different from the identifier of the first data flowcell; and forwarding different data flowcells on different sampling paths selected from the d sampling paths when (1) paths with a smallest network congestion extent that are collected in different preset sampling periods are different and (2) a forwarding duration of a data flowcell is greater than a length of a sampling period.

18. The non-transitory computer readable storage medium of claim 17, wherein the computing device further executes the computer usable program code to:

randomly select, according to the preset sampling period, the d sampling paths from the n paths from the source switch to the destination switch;

send d sampling probes in a one-to-one correspondence with the d sampling paths to the destination switch;

receive a feedback probe for each sampling probe in the d sampling probes from the destination switch; and obtain the congestion extent indication information for each sampling path carried in the feedback probe of each sampling probe.

19. The non-transitory computer readable storage medium of claim 18, wherein the computing device further executes the computer usable program code to:

randomly select d1 sampling paths from the n paths according to the preset sampling period when n is less than a first preset threshold; and randomly select d2 sampling paths from the n paths according to the preset sampling period when n is greater than or equal to the first preset threshold, wherein d1 is less than d2, and wherein d2 is less than n.

20. The non-transitory computer readable storage medium of claim 19, wherein a sampling probe or a feedback probe of the sampling probe is a data packet in a specified format comprising a probe header, wherein a first quantity of bits comprised in the probe header identifies a sampling path number, and wherein a second quantity of bits comprised in the probe header identifies congestion extent indication information of a sampling path.

* * * * *

UNITED STATES PATENT AND TRADEMARK OFFICE
CERTIFICATE OF CORRECTION

PATENT NO. : 11,184,284 B2
APPLICATION NO. : 16/285796
DATED : November 23, 2021
INVENTOR(S) : Georgios Trimponias, Zhitang Chen and Hong Xu Page 1 of 1

It is certified that error appears in the above-identified patent and that said Letters Patent is hereby corrected as shown below:

In the Claims

Claim 9, Column 25, Line 34: "forwarding different" should read "forward different"

Claim 17, Column 27, Line 17: "forwarding different" should read "forward different"

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*